(12) United States Patent
Elliott

(10) Patent No.: US 6,963,747 B1
(45) Date of Patent: Nov. 8, 2005

(54) GLOBALLY OPTIMIZED CHANNEL ACCESS FOR WIRELESS NETWORKS

(75) Inventor: Brig Barnum Elliott, Arlington, MA (US)

(73) Assignee: BBNT Solutions LLC, Cambridge, MA (US)

(*) Notice: Subject to any disclaimer, the term of this patent is extended or adjusted under 35 U.S.C. 154(b) by 544 days.

(21) Appl. No.: 10/066,229

(22) Filed: Jan. 31, 2002

(51) Int. Cl.[7] ............................................... H04Q 7/20
(52) U.S. Cl. .................. 455/450; 455/452.1; 455/465; 370/389; 370/468; 370/445; 370/437; 370/438; 370/395.51; 370/395.2; 370/222; 370/223; 370/231; 370/232; 370/235; 709/227; 709/241; 709/224
(58) Field of Search .............................. 455/450, 452.1, 455/465; 370/389, 468, 437, 445, 395.51, 370/395.52, 395.6, 395.64, 254, 395.2; 709/227, 709/224, 241

(56) References Cited

U.S. PATENT DOCUMENTS

| | | | |
|---|---|---|---|
| 5,854,899 A | 12/1998 | Callon et al. | |
| 6,286,052 B1 | 9/2001 | McCloghrie et al. | |
| 6,397,359 B1 * | 5/2002 | Chandra et al. | 714/712 |
| 6,654,374 B1 * | 11/2003 | Fawaz et al. | 370/394 |
| 6,665,311 B2 * | 12/2003 | Kondylis et al. | 370/462 |
| 6,667,956 B2 | 12/2003 | Beshai et al. | |
| 6,704,293 B1 * | 3/2004 | Larsson et al. | 370/255 |
| 6,714,517 B1 * | 3/2004 | Fawaz et al. | 370/236 |
| 6,744,772 B1 * | 6/2004 | Eneboe et al. | 370/400 |
| 6,757,282 B1 * | 6/2004 | Ofek | 370/389 |
| 6,788,702 B1 * | 9/2004 | Garcia-Luna-Aceves et al. | 370/458 |
| 6,791,997 B2 * | 9/2004 | Beyer et al. | 370/447 |
| 6,795,442 B1 * | 9/2004 | Clayton et al. | 370/395.41 |

* cited by examiner

Primary Examiner—Marceau Milord
(74) Attorney, Agent, or Firm—Fish & Neave IP Group Ropes & Gray LLP

(57) ABSTRACT

A method can change transmit schedules in an ultra-wideband radio network by collecting traffic flow information from the nodes in the network, calculating new schedules that can be based on the traffic flow information and that can maintain traffic collisions on the network below predetermined levels, disseminating the new schedules to the network nodes and synchronizing a switch to the new schedules. The calculations for the new schedules can employ "hard" problem solution techniques, such as simulated annealing, genetic algorithms, complete searches and heuristics.

37 Claims, 4 Drawing Sheets

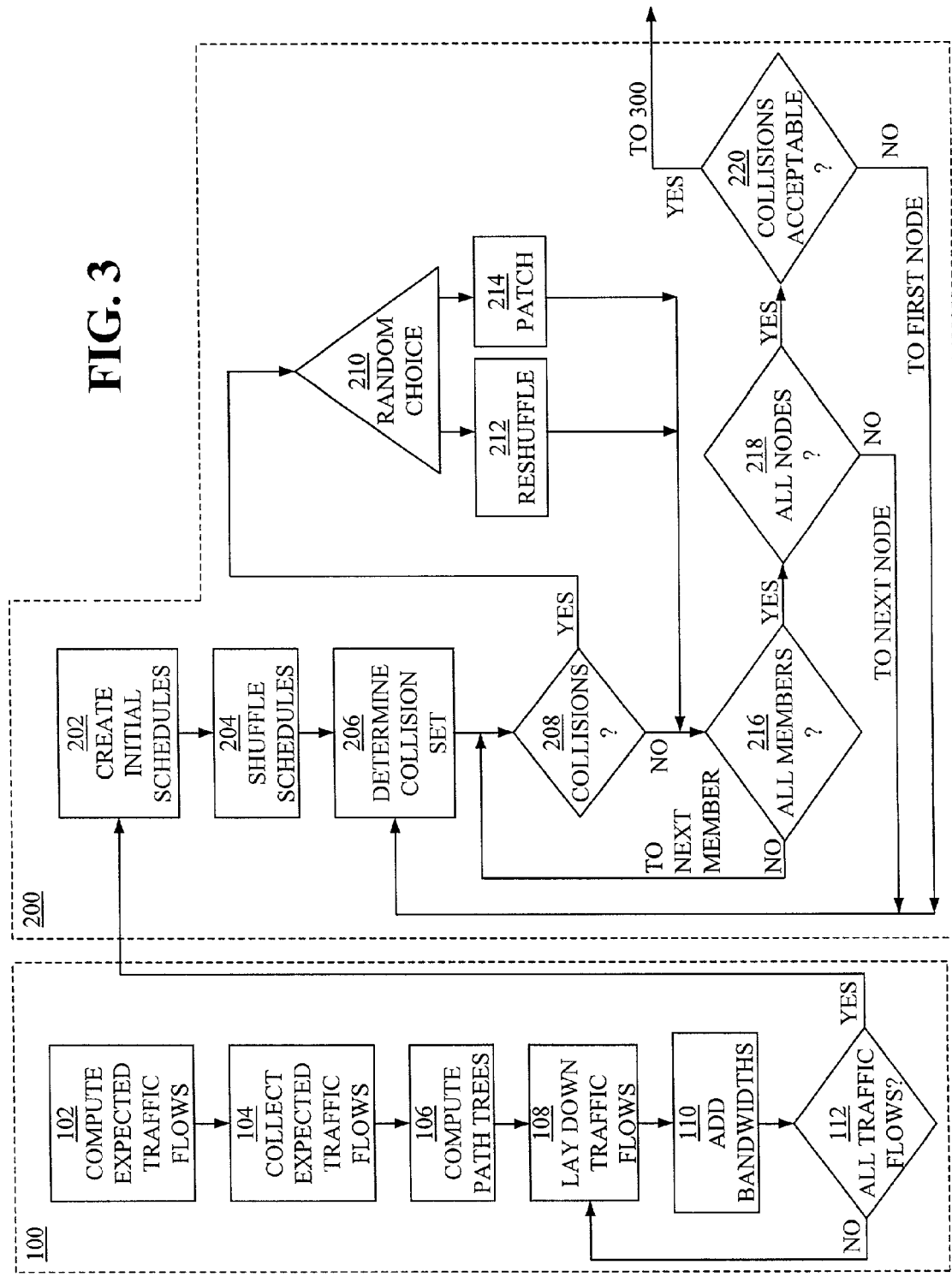

Star Network 20

Mesh Network 10

Star Network 20

Mesh Network 10

GLOBALLY OPTIMIZED CHANNEL ACCESS FOR WIRELESS NETWORKS

This application is co-pending with a related patent application entitled "Dynamic Channel Scheduling Based on Global Traffic Flows," application Ser. No. 10/062,989, by the same inventor and having assignee in common, filed Jan. 31, 2003 and incorporated by reference herein in its entirety.

FIELD OF THE INVENTION

The invention relates to wireless networks, and more particularly to providing optimized transmit schedules for wireless networks.

BACKGROUND

In a wireless ad hoc network, the nodes of the network can be equipped with wireless communications transceivers. Some of the nodes may be capable of network routing functions ("routers") and the others may be merely sources or destinations for data traffic ("endpoints"). The nodes can execute a set of algorithms, and perform a set of networking protocols, that enable the nodes to find each other, determine paths through the network for data traffic from source to destination(s) and to detect and repair ruptures in the network as nodes fail, as battery power changes, as communications path characteristics change over time, and so forth.

One known subset of ad-hoc networks employs ultra-wideband (UWB) radios. UWB radios employ very short RF bursts in order to convey digital information. These bursts are very accurately clocked so that both the sending radio and the receiving radio(s) agree on when a burst is going to be sent. At that moment, the sending radio (the transmitter, Tx) will activate its transmitter in order to send an RF burst. At the same moment, the receiver(s), Rx, will activate their receivers so that they will be able to receive the burst that Tx is sending.

Thus, UWB radios have a distinctive form of "channel access" in which a transmitter has a schedule of very precise times at which it will transmit. The receivers need to know this schedule in order to be able to receive these transmissions. Schedules may need to be changed or revised to accommodate traffic flow over the network, or other constraints such as signal interruptions or radio failures.

UWB radio technology is well known, as are methods for synchronizing the radios in a network, i.e., how the various radios of the network come to agree on the precise shared timing of the schedule and set their internal clocks accordingly. What is needed are methods and systems to give the radios new time schedules, as the network is operating, in response to traffic flow and/or events affecting traffic flows.

SUMMARY OF THE INVENTION

According to the systems and methods disclosed herein, a method or a program of instructions can provide updated channel access schedules for an operating network by collecting traffic flow information from the network nodes, calculating the channel access schedules for the nodes based on the information, configuring the schedules to provide no more than a predetermined level of transmit collisions between nodes, disseminating the updated channel access schedules to the nodes and switching the network to the updated channel access schedules.

The channel access schedules can be configured by applying techniques used in solving mathematically hard problems, such as genetic algorithms, complete searches, heuristics and simulated annealing. The channel access schedules may be first checked for the number of transmit collisions between neighboring nodes and between nodes that share neighbors. When a simulated annealing technique is used, node schedules can be patched or can be randomly reshuffled to avoid collisions if collisions exist above a predetermined level.

In a further feature of the present invention, a network can be configured to determine channel access schedules for nodes operating on the network. The network includes: a collection module to obtain traffic flow information from the nodes; at least one processor to calculate the channel access schedules for the nodes based on the information and to configure the channel access schedules to provide no more than a predetermined level of transmit collisions between nodes; a broadcast module to disseminate the channel access schedules to the nodes; and a synchronizer to switch the network to the channel access schedules at a given time.

BRIEF DESCRIPTION OF THE DRAWINGS

The following figures depict certain illustrative embodiments in which like reference numerals refer to like elements. These depicted embodiments are to be understood as illustrative and not as limiting in any way.

FIG. 3 is a flow chart illustrating a method of computing schedules for a wireless network;

FIG. 5 shows schematic scheduling slots for nodes of the network of FIG. 4a.

DETAILED DESCRIPTION OF CERTAIN ILLUSTRATED EMBODIMENTS

Figure 4B:
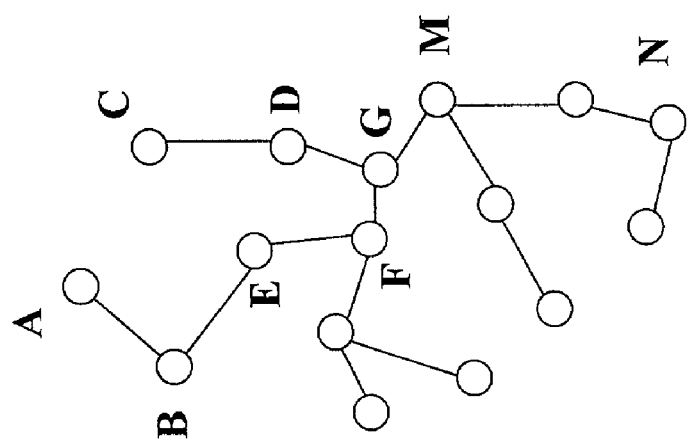
FIGS. 4a and 4b show schematic illustrations of ad hoc wireless networks.
Figure 4A:
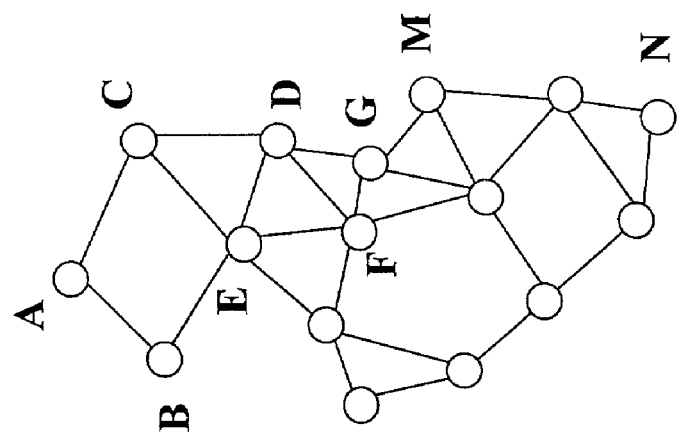

Referring to FIGS. 4a and 4b, there are shown schematic illustrations of two ad hoc wireless networks. FIG. 4a depicts a mesh network 10 and FIG. 4b depicts a star network 20. It is understood that ad hoc networks can have numerous configurations, of which the mesh network and star network of FIGS. 4a and 4b, respectively, are two such configurations. In FIGS. 4a and 4b, the radio nodes are indicated by circles. The lines between circles illustrate "neighbor relationships." That is, a line may be drawn between two nodes if these nodes can directly communicate with each other by radio transmissions. Communication between non-neighbor nodes may be impossible due to being out of radio range, obstacles such as buildings in the way, etc.

In FIG. 4a, radio node A can be a neighbor to nodes B and C; node C can be a neighbor to nodes A, E and D; and node D can be a neighbor to nodes C, E, F and G. In FIG. 4b, which has the same geometric layout of nodes, node A can be a neighbor of node B and not node C; node C can be a neighbor of node D and not nodes A and E; and node D can be a neighbor of nodes C and G.

Optimum network operation may require that neighboring nodes have distinct transmit schedules. In the simplest case, using network 10 as an example, if node C transmits at the same time as node D, their transmissions can collide. Thus, nodes C and D may not receive each other's transmission, as their transmitters will be turned on instead of their receivers, but also other nodes such as node E may be unable to correctly receive transmissions from either node C or node D because of their competing signals.

It is also noted that optimum operation of network 10 may further require that non-neighboring nodes having a common neighbor node not transmit at the same time. As an example, node D is a common neighbor to nodes C and G. Thus, if nodes C and G transmit at the same time, node D will be in the same position as node E in the previous example, i.e., node D may not correctly receive transmissions from either node C or node G because of their competing signals.

It is noted that this strict definition, i.e., that the schedules prevent collisions, may not be practical for working networks, e.g., in complex networks having large numbers of neighbor connections. Generally, UWB systems may use a set of bursts to encode a given transmitted symbol, and not just a single burst as implied above. With sufficient error correction in such a system, the corruption of a single burst can be corrected, and so collisions between neighboring schedules can be accommodated.

Figure 5:
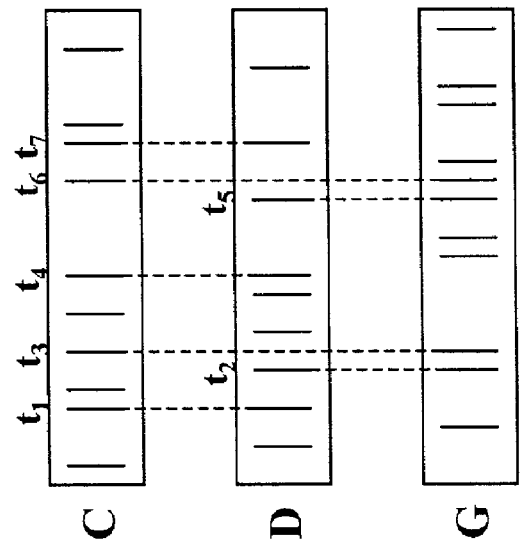

In general, then, the transmit schedules for the nodes in an ad-hoc network may be assigned so that collisions between neighboring nodes can be kept below a maximum level that can be compensated for with error correction. Additionally, collisions for nodes that share a neighbor (e.g. C and G in the example above) may also be kept below this level. FIG. 5 shows an example of schematic scheduling slots for nodes C, D and G, generally meeting the above constraints. As shown in FIG. 5, collisions occur between nodes C and D at times $t_1$, $t_4$ and $t_7$; between nodes C and G at times $t_3$ and $t_6$; and between D and G at times $t_2$ and $t_5$. The method described below for dynamically assigning new transmit schedules to nodes in an ad-hoc network can take these constraints into consideration.

Figure 1:
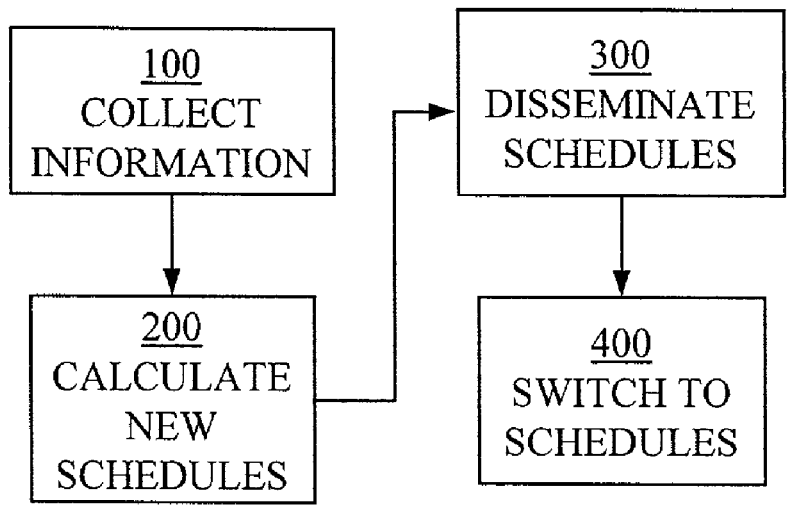
FIG. 1 is a flow chart illustrating a method providing new schedules for a wireless network.

FIG. 1 is a flow chart of a method that can be used to assign schedules to nodes, which can include four major actions. In a first action 100, a master node may collect all relevant information from the network. In the networks of FIGS. 4a and 4b, the master node is designated as node M. The master node M may collect information continuously, as the network is in operation, or may collect information at those times when it is desirable to calculate new schedules. It may poll for the necessary information, or by contrast, the necessary information may be "pushed" to it at selected intervals without a request on its part. The relevant information can include: the current neighbors of each node; the transmit power needed in order to close the link to these neighbors; current or expected traffic loads for a given node (i.e. how much it will need to transmit); remaining battery power; and other types of information as may be useful for operating and monitoring the network.

Second, the node M may perform (at 200) a calculation, described in further detail hereafter in order to determine new transmit schedules for the nodes in the network or some number of the nodes. At the end of operation 200, the master node M can have a complete set of new schedules for the nodes in the network.

Third, the master node M may disseminate (at 300) these new schedules to the nodes. It is to be noted that a given transmit schedule can be used by both the transmitting node itself (for transmissions) and its neighbors (for receiving). Thus each transmit schedule must be disseminated to a small group of related nodes, i.e., the transmitting node and its neighbors. Dissemination can be accomplished in a variety of ways, e.g., via reliable flood techniques known in the art, via a reliable point-to-point protocol such as Transmission Control Protocol (TCP), via a reliable multicast protocol, and so forth. Dissemination methods may be acceptable so long as they can have a high probability of getting the schedules to the nodes whose schedules are being updated. Note further that the new schedules can be disseminated as changes to the nodes' existing schedules, or as entirely fresh schedules, etc.

Fourth, at some predetermined or calculated moment in time, all nodes in the network may switch (at 400) to using the newly disseminated schedules instead of the prior schedules. This form of synchronization can be implemented in a number of different ways. One implementation may use the inherent close clock-synchronization that is already present in UWB radios. Another may use external clock sources such as a global positioning system (GPS). A further implementation may use external forms of cues as to when the new schedules should be put into effect, e.g., an RF pulse on a different frequency that acts as a signal to switch schedules.

As described, master node M computes a single schedule for the nodes. However, it may be more advantageous to compute a series of schedules when performing action 200. The schedules may be disseminated as they are computed or they may be disseminated in a batch. Schedules disseminated in a batch mode can then be brought into effect at the appropriate time for the respective schedule.

Referring now to FIG. 3, a flow chart for calculating new transmit schedules, i.e. action 200 of FIG. 1, is shown. It can be noted that action 200 can fall into a category of mathematical problems known as "hard" problems. To avoid transmit collisions, the calculation action 200 may bring the schedules for neighboring nodes and nodes that share a neighbor, into harmony with one another. In general, neighbor-connectivity in an ad-hoc network can be an arbitrary graph, such that harmonizing the transmit schedules of the nodes is a multivariate function of the connectivity of the nodes.

Methods for obtaining solutions to "hard" problems are known in the art and may include genetic algorithms, complete searches of all possible schedules and heuristics. The flow chart of FIG. 3 shows a preferred embodiment using a simulated annealing technique.

Simulated annealing is a Monte Carlo approach for minimizing such multivariate functions, the term deriving from the roughly analogous physical process of heating and then slowly cooling a substance to obtain a strong crystalline structure. In general applications of simulated annealing, a system can be initialized with a particular configuration. A new configuration can be constructed by imposing a random displacement. The new state can be examined to determine if its "energy" is lower than that of the previous one. In this context, the "energy" of the system or state can be the multivariate function to be minimized. If the energy is lower, the change can be accepted unconditionally and the system can be updated. If the energy is greater, the new configuration can be accepted probabilistically. This procedure can allow the system to move consistently towards lower energy states, yet still 'jump' out of local minima due to the probabilistic acceptance of some upward moves.

In applying the simulated annealing techniques to the calculation of new transit schedules, the system can be initiated by setting random schedules for the nodes. New schedules can be constructed by random shuffles of the node schedules. The "energy" of the scheduling system can be determined by an examination of the collisions between nodes. New node schedules with fewer collisions can be accepted and new node schedules with greater energy, or more collisions, can be shuffled or patched in a probabilistic manner. The process can be repeated until the number of collisions reaches a predetermined acceptable level.

Referring again to FIG. 3, initial schedules for the nodes are created at 202. The initial-schedule for a node consists of a string of 1's (denoting when the node may transmit) followed by a string of 0's (denoting when the node must be silent). The string lengths for the schedules of the network nodes may generally be the same and the strings may be long. As an example, the nodes in the network may have a schedule of, say, 10,000 bits long.

Figure 2:
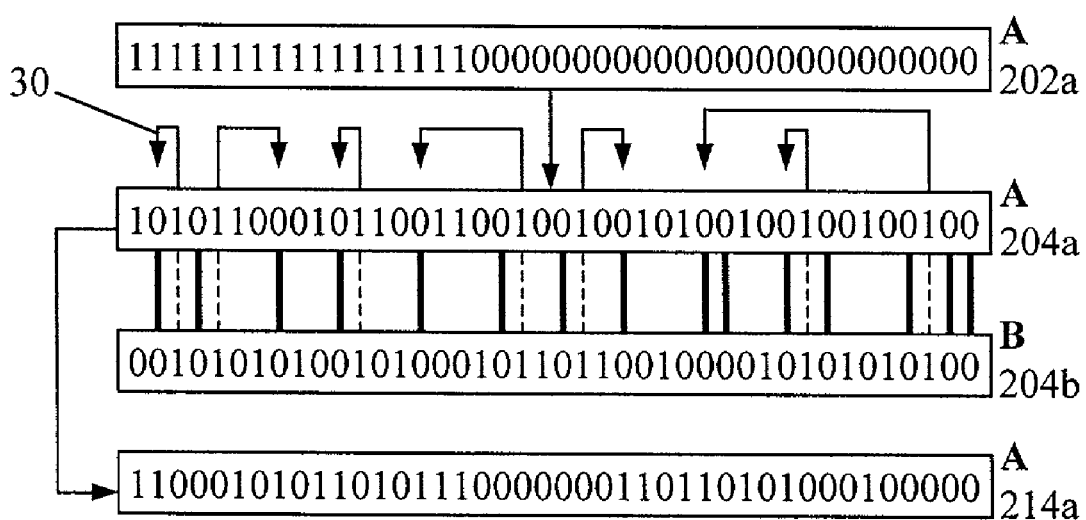
FIG. 2 is a schematic representation of schedule shuffling and patching.

Some nodes may be more heavily weighted than others. That is, they can be allowed more transmit slots in the overall schedule. For example, node A may be allowed 200 transmit slots of the 10,000 while node B may only be allowed 50 transmit slots. Thus node A will have an initial prefix consisting of 200 1's, while node B has an initial prefix consisting of 50 1's. In principle, the nodes can be given different weightings, and those nodes with heavier weightings will have more access to the shared RF channel than those with lighter weightings. An illustrative example of an initial schedule 202a for node A is shown in FIG. 2.

To determine appropriate weightings for the nodes, the information collected at 100 may include network throughput requirements of the nodes within a network. Using the information collected for individual nodes, the method illustrated in FIG. 3 can determine the amount of bandwidth that can be set aside for each node to transmit to a given neighbor in order to have sufficient bandwidth to handle the required overall traffic flows. The set aside bandwidth can be used to calculate the weightings or transmit slots (i.e. the number of 1's) in the initial schedules 202a. As a result, one can create an overall channel access plan for the network that can satisfy the traffic flow requirements for the network.

In one method of determining the bandwidth to be set aside, the nodes may compute (at 102) their own expected near-term future traffic flows, i.e. flows originating from the node and flowing to the destination nodes for that flow in the network. The flows can be characterized as tuples, including source node, destination node and bandwidth in bits per second. Thus, a given traffic source, or node, in the network may compute one or more such tuples, with the first item in the tuples being the identity of the source node.

The nodes may estimate traffic flows on the basis of trend analysis of recent traffic flows, periodic traffic flows, etc. The estimate may also include estimates of future traffic based on anticipated bandwidth requirements. For instance, when a sensor node determines that it is about to initiate a live video feed, it can estimate that it will need sufficient bandwidth to carry this video traffic to a collection point for some seconds or minutes into the future. As noted, nodes can execute algorithms and perform networking protocols that can be designed to provide these estimates.

Master node M may collect all the traffic flow tuples from all nodes in the network at 104. Thus, master node M can learn the entire set of expected traffic flows through the network. A node may send this information to the master node M by a transport protocol, such as the TCP or User Datagram Protocol (UDP) protocols in the Internet protocol suite, or corresponding Asynchronous Transfer Mode (ATM) protocols, or specialized protocols, etc.

As noted previously, master node M may have, or may have obtained, information relative to the topology of the network. Such mapping may be readily available to master node M, depending on the network routing used. For example, Link State routing can provide such mapping information. It can also be determined in networks that employ various other routing protocols, e.g., certain protocols that may be specialized for large sensor networks. Once the master node M has collected the set of traffic tuples and has the network topology information, it can compute the aggregate traffic load on the links in the network.

The aggregate traffic flow can be computed as the aggregate bits per second (bandwidth) from a given node to its neighbor nodes. Such aggregate traffic loads may be calculated by methods known in the art, such as the Ford-Fulkerson method. Thus, the more bits per second that a node may need to transmit to another node in order to carry the aggregate traffic load for that link, the more 1 bits that may need to be set in its initial schedule. In this manner a particular transmission path can have sufficient access to the shared RF channel to carry the aggregate load for that link.

Given the tuples and the network topology, the master node M lay down the traffic flows across the network. To do so, master node M computes at 106 the all-pairs shortest path trees for the network. The computation 106 can be one of the standard, graph-theoretic algorithms known in the art that produces path trees for the nodes in the network. The corresponding shortest-path tree for a node contains the set of links that lead from that node to all other nodes in the network with minimal cost. As used herein, minimal cost can include such parameters as number of nodes traversed, distance between nodes, known quality of the links, etc.

Using the set of path trees as a guide, the traffic flows can be layed down across the network graph at 108. Consider, for example, traffic flows that can originate at Node A. At 106, the shortest path tree from A to the other nodes in the network can be found. At 108, the traffic flows can be layed down across the network graph by running through traffic tuples that may have A as the first element, or source node. For these tuples, the shortest path to the destination node from A can be determined by means of the shortest-path tree. This process can provide a series of links leading from node A through the network graph to the destination node.

As the links are layed down at 108, the traffic bandwidth (from the tuples) for the links are added at 110, accumulating a running total of traffic bandwidth that may transit the links. In adding the link traffic bandwidths at 110, it may be desirable to include estimation correction factors to provide sufficient bandwidth to accommodate inaccuracies in estimations, traffic surges, load fluctuations, etc. The factor may include: an additive factor, adding bandwidth to each link, or proportionally adding bandwidth; a multiplication factor; and/or some other factor as may be known by those skilled in the art.

When done laying down traffic flows across the graph, as determined at 112, the accumulated total bandwidth for links in the network can indicate how many bits per second (or equivalent) may be required to transit a link in order for the aggregate traffic across the link to be carried. The accumulated bandwidth for the links associated with a node can be used as the weighting factor to proportionally set the number of 1-bits in the initial transmit schedule for the node. As noted, the above is one method for determining the bandwidth to be set aside. Depending on the complexity of the network, processing capabilities, etc., other methods may be used. As an example, master node M may simply use the current or expected traffic loads provided by the nodes, with or without the correction factors noted, and without accumulating loads across links.

Figure 6B:
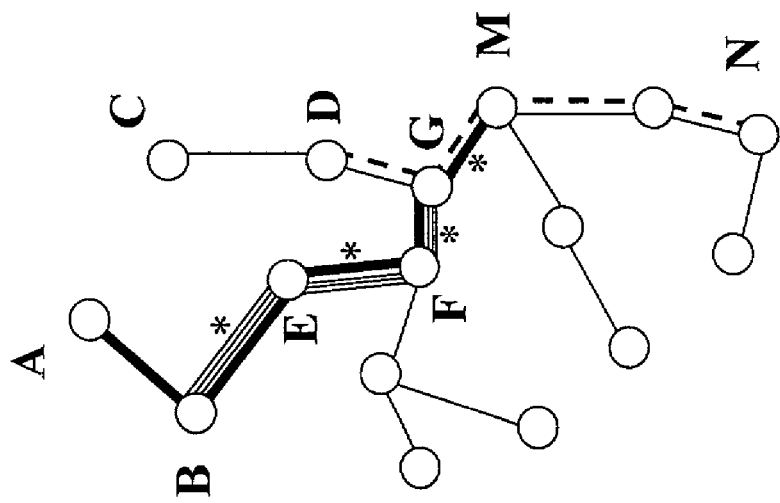
FIGS. 6a and 6b show schematic illustrations of traffic flows on the networks of FIGS. 4a and 4b, respectively.
Figure 6A:
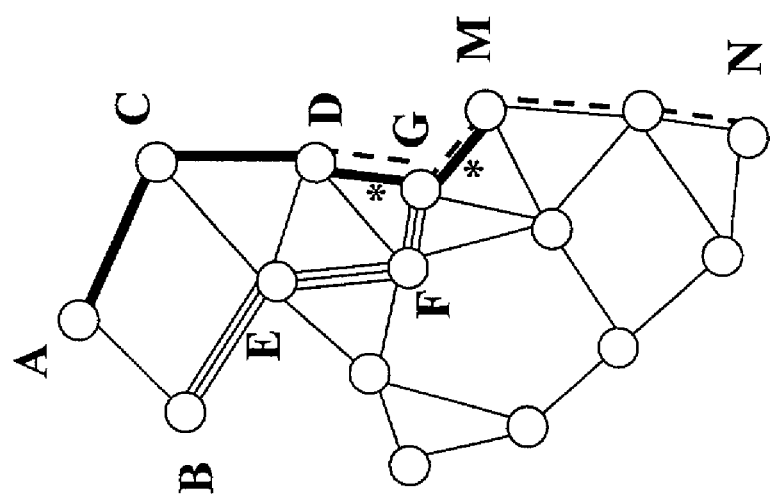

FIGS. 6a and 6b illustrate traffic flows layed down on the networks 10 and 20 of FIGS. 4a and 4b. Links with two or more flows, indicated by the symbol "*" in FIGS. 6a and 6b, would have accumulated traffic bandwidths for the flows. As an example, the links between nodes D and M in FIG. 6a can include traffic flows between nodes A and M and D and N, with exemplary bandwidths equivalent to 50 and 200 bits, respectively. Thus, links D–G and G–M may require bandwidths equivalent to a total of 250 bits. Referring to FIG. 6b, it can be seen that the network topology may affect the aggregated flows over the links. Using the same example, only link G–M includes the aggregated traffic flows between nodes A and M and D and N. However, links B–E, E–F and F–G include aggregated traffic flows between nodes A and M and B and G.

Once the initial schedules have been created at 202, a random shuffle of the strings in the schedules can be performed at 204. This random shuffle can be described by the following pseudo-code:

For I=1 to # of slots in schedule
   Let r=random number between 1 and #slots
     Swap bit[i] with bit[r]
Next I The random number generator may be one of many random number generators known in the art. For example, it may be advantageous in military networks to employ a physical random number generator for truly random numbers. This may prevent an adversary from discovering a pattern in the transmit schedules, which discovery might lead to detection and/or disruption of traffic flows through the network. Cryptographic random number generators may also be used. In other cases, e.g., in networks where security may not be a major concern, a much simpler pseudo-random number generator may provide satisfactory performance.

The random shuffle (204) can result in a scrambled transmit schedule 204a as illustrated in FIG. 2. It can be noted that the scrambled version 204a may have the same number of 1's as the initial schedule 202a, but the 1's may appear at random places in the sequence of 1's and 0's. The shuffled schedules may need to be harmonized so that collisions at neighboring nodes, and nodes that share a common neighbor do not exceed levels correctable by error detection algorithms.

Schedules can be harmonized by employing simulated annealing. Generally, a series of passes can be made over the data structure that represents the neighbor-connectivity in the network. The nodes can be inspected in turn, with a node's collision set being determined at 206. The collision set can include the node's neighbors and those nodes that share a common neighbor with the node under inspection. The nodes in the collision set, or members of the collision set, can also be inspected in turn.

Once the collision set for a node has been determined at 206, the members or nodes of the collision set are examined in turn to check for collisions (208). FIG. 2 illustrates the shuffled schedules (204a, 204b) for nodes A and B, respectively. Node B can be a member of the collision set for node A, which further can include neighbor node C and common neighbor nodes E and D. There can be a collision whenever node A's transmit schedule has a 1 in the same place as does a node in its collision set (in this case, node B). In the illustration of FIG. 2, collisions are indicated by dashed lines and times when both nodes are not transmitting (both schedules have a 0 in the same place) are indicated by heavy lines.

When a collision is encountered, a random choice in made (210) to reshuffle the schedule of the node being investigated (212) or to correct the collision (214). While the choice can be random, the probabilities of the outcomes can be weighted such that the probability of reshuffling is low. The probability may be estimated a priori, based on analyses of likely collision scenarios and statistics of the size of collision sets and traffic flows of similar networks. Alternatively, the probability may be based on the results of simulations and/or real world experience with the use of differing probabilities and their effect on network behavior.

The reshuffle at 212 can operate in the manner of the schedule shuffle at 204. With a higher probability, i.e., corresponding to not reshuffling, the schedule for node A can be patched to remove at least some of the collisions. In FIG. 2, the schedule for node A may be patched by moving one or more 1's from collision locations into locations where schedules for nodes A and B both have 0's, as indicated by arrows 30. The resulting schedule, illustrated as 214a in FIG. 2, can thus have collisions removed.

It is noted, that a wide variety can be allowed in how the patches, or minor fixes can be applied. For instance, one can make just one of the various minor fixes that need to be made, or all of them, or indeed any number in between. In some embodiments, it may be preferable that a randomized subset of the collision sites be moved. Further, it may be advantageous to move the 1's to random free sites, as illustrated in FIG. 2, as apposed to using the nearest free site. As in the case of setting the reshuffling probability, analyses of network criteria, or the results of simulations and/or network experience can determine the patching mode to be used. Additionally, constraints on the transmit schedules, as described in further detail hereafter, may influence the choice of the patching mode.

Once the method has either reshuffled or patched a given node schedule for a member of its collision set, it can proceed to the next member of the collision set as determined at 216. When the members of a node's collision set have been considered, the method can then proceed to the next node in the graph, as determined at 218, and consider its collision set. Once the nodes in the graph have been so processed, a complete pass through the graph can have been performed.

At the end of a complete pass, one can check at 220 whether the number of remaining collisions is acceptable. Checking for an acceptable level of collisions at 220 may include checking the number of collisions at individual nodes as well as checking the total number of collisions over the network. In some cases, this may mean that zero collisions remain. In other cases, as discussed above, a higher number of collisions may be acceptable. If the number of collisions remaining is acceptable, the new schedules for nodes in the network can be disseminated at 300. If the number of collisions in the new schedules is not acceptable, the method can return to 206 to begin the next pass through the network graph, and can proceed until the number of collisions is acceptable.

The method can take an indeterminate number of passes through the network graph. Thus, in general, the method can require an unbounded amount of time and processing power, or battery power, in order to determine schedules for the nodes. In practice, however, such simulated annealing techniques can very quickly come up with an acceptable set of schedules provided that the transmit schedules are relatively sparse (i.e. that the number of 1s in any given transmit schedule may be small compared to the number of zeros). As an example, a network may have less than 1% of its slots actively in use by the transmitters, and the size of a collision set may be limited to ten nodes. Thus the maximum utilization of a channel may be no more than 10%.

The method has been described in connection with UWB system, but may be applicable to other, popular channel access techniques in addition to UWB. For example, the method can be employed to compute new channel access schedules for spread-spectrum systems—both the frequency-hopping variety as well as the direct-spread variety. It can also be employed for conventional Time Division Multiple Access (TDMA) systems. Furthermore, it can be employed for hybrids among these various schemes, such as a frequency-hopping TDMA system.

The simulated-annealing technique can be suitable for calculating schedules where channel access is sparse. Hence, the technique can be a natural match for UWB radios, which conventionally employ very sparse channel access. The technique, however, may not be suitable for dense channel access systems, e.g., for a tightly packed TDMA system that leaves little "dead air" time. In these cases other "hard" problem techniques, such as genetics, exhaustive search, etc., may be employed in lieu of the simulated annealing techniques of 210–214.

As described, only a single master node M may compute schedules for the other nodes in the network. The method, however, can be extended to have a set of master nodes responsible for regions within the network. In some cases, it may be advantageous to have the nodes compute their own schedule, thus having no master node. In these cases, the nodes independently gather the relevant information for computing their schedules. If necessary, the independently computed schedules can be shared with collision set members and the nodes may then independently harmonize their schedules.

Alternatively, the nodes may harmonize their schedules using current collision set member schedules. The independent schedule computations may be synchronized such that the nodes compute schedules at given times. The computation times may themselves be independent, with the independently computed schedules activated at a predetermined time throughout the network. In the above alternative methods, there can be a straightforward trade here between the amount of processing needed in the nodes and the amount of information that needs to be disseminated.

As discussed herein, the schedules may be completely random. In practice, there may be constraints placed on the schedule that can limit which slots may be used for transmission, e.g. requiring a certain number of unused slots between slots devoted to transmission. Such a constraint may be useful for UWB transmissions in an urban environment, since the different frequencies in the pulse may take differing amounts of time to reach a receiver, due to the varying frequency-dependent effects of multipath propagation. Constraining the transmission to provide a certain amount of deadtime may ensure that received pulses within the corresponding time interval can be multipath reflections of a single, original transmit pulse. Another type of constraint that can be imposed may be to scatter transmit pulses more or less uniformly across the schedule to avoid too much energy in one part of the schedule. Alternatively, pulses may be concentrated in a limited region of the schedule in order to allow receivers to be turned on steadily to receive the pulses. Such constraints can be incorporated at 202 and 204 in the manner that the 1's and 0's may be allocated.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. Accordingly, the spirit and scope of the present methods and systems is to be limited only by the following claims.

What is claimed is:

1. A method for providing channel access schedules, comprising:
   collecting traffic flow information from at least one node operating on a network;
   calculating the channel access schedules for the at least one node based on the information, the channel access schedules configured to provide no more than a predetermined level of transmit collisions between nodes;
   disseminating the channel access schedules to the at least one node; and
   switching the network to the channel access schedules.

2. The method of claim 1, wherein calculating comprises iteratively harmonizing the channel access schedules of nodes on the network.

3. The method of claim 2, wherein harmonizing comprises minimizing a multivariate function of connectivity between the nodes.

4. The method of claim 3, wherein harmonizing comprises applying at least one of a list of techniques for solving mathematically hard problems consisting of genetic algorithms, complete searches, heuristics and simulated annealing.

5. The method of claim 1, wherein calculating comprises:
   creating schedules; and
   iteratively harmonizing the created schedules until the predetermined level of transmit collisions is obtained.

6. The method of claim 5, wherein harmonizing comprises minimizing a multivariate function of connectivity between the nodes.

7. The method of claim 6, wherein harmonizing comprises applying at least one of a list of techniques for solving mathematically hard problems consisting of genetic algorithms, complete searches, heuristics and simulated annealing.

8. The method of claim 5, wherein creating comprises:

determining a number of transmit slots to be assigned for a node based on the traffic flow information for the node; and randomly assigning the number of transmit slots as part of a group of time slots for the node.

9. The method of claim 8, wherein harmonizing comprises:

determining if transmit collisions exist between transmit slots assigned to nodes; and reassigning transmit slots for nodes where transmit collisions exist.

10. The method of claim 9, wherein determining if collisions exist comprises:

defining collision sets for the nodes of the network to include neighbor nodes and nodes having at least one common neighbor node;

comparing transmit slots of a node with transmit slots of nodes in its collision set; and defining a collision when a transmit slot in the node corresponds with a transmit slot in the nodes of its collision set.

11. The method of claim 9, wherein reassigning comprises randomly choosing at least one of moving transmit slots with collisions to slots that avoid collisions and randomly reassigning transmit slots with collisions and without collisions.

12. The method of claim 11, wherein a probability of choosing randomly reassigning transmit slots is less than a probability of choosing moving transmit slots.

13. The method of claim 11, wherein moving transmit slots comprises randomly moving transmit slots.

14. The method of claim 8, comprising placing constraints on randomly assigning the number of transmit slots to provide for at least one constraint taken from a list consisting of maintaining a minimum separation between transmit slots and maintaining predetermined energy levels over portions of the group of time slots.

15. The method of claim 1, wherein collecting comprises at least one master node collecting the traffic flow information.

16. The schedule of claim 1, wherein calculating the channel access schedules comprises calculating changes to existing channel access schedules.

17. The method of claim 1, comprising;

calculating a series of channel access schedules; and batching the series of channel access schedules for dissemination as a group.

18. The method of claim 1, wherein disseminating comprises distributing the channel access schedules by at least one technique taken from a list consisting of a flood technique, a point-to-point protocol and a multicast protocol.

19. The method of claim 1, wherein switching comprises synchronizing the nodes of the network by at least one synchronizer taken from a list consisting of an internal clock, a global positioning system and an energy pulse.

20. The method of claim 1, wherein calculating comprises individual nodes operating on the network independently creating their respective channel access schedule.

21. The method of claim 20, wherein creating comprises harmonizing the respective channel access schedule of the individual nodes with channel access schedules of neighbor nodes of the individual nodes and of nodes having at least one common neighbor with the individual nodes.

22. The method of claim 20, wherein calculating comprises synchronizing the independent creation of respective access schedules.

23. A computer program tangibly stored on a computer-readable medium and operable to cause a computer to enable a network to determine channel access schedules for nodes operating on the network, the computer program comprising instructions to:

collect traffic flow information from the nodes;

calculate the channel access schedules for the nodes based on the information, the channel access schedules configured to provide no more than a predetermined level of transmit collisions between nodes;

disseminate the channel access schedules to the nodes; and switch the network to the channel access schedules.

24. The computer program of claim 23, wherein the program is individually operable by the nodes.

25. The computer program of claim 24, wherein the instructions to calculate comprise instructions to:

create a node channel access schedule for an individual nodes; and harmonize the node channel access schedule with channel access schedules of collision set member nodes consisting of neighbor nodes of the individual node and of nodes having a common neighbor with the individual node until the predetermined level of transmit collisions is obtained.

26. The computer program of claim 25, wherein the instructions to harmonize comprise instructions to minimize a multivariate function of connectivity between the collision set member nodes.

27. The computer program of claim 26, wherein the instructions to harmonize comprise instructions to apply at least one of a list of techniques for solving mathematically hard problems consisting of genetic algorithms, complete searches, heuristics and simulated annealing.

28. The computer program of claim 25, wherein the instructions to create comprise instructions to:

determine a number of transmit slots to be assigned for the individual node based on the traffic flow information for the individual node; and randomly assign the number of transmit slots as part of a group of time slots for the individual node.

29. The computer program of claim 28, wherein the instructions to harmonize comprise instructions to reassign transmit slots for the individual node when a transmit slot in the individual node corresponds with a transmit slot of the channel access schedule of at least one of the collision set member nodes.

30. The computer program of claim 29, wherein the instructions to reassign comprise instructions to randomly branch to at least one of instructions to move transmit slots with collisions to slots that avoid collisions and instructions to randomly reassign transmit slots with collisions and without collisions.

31. The computer program of claim 30, wherein the instructions to randomly branch are weighted to choose instructions to randomly reassign with a less probability than to choose instructions to move transmit slots.

32. The computer program of claim 30, wherein the instructions to move transmit slots comprises instructions to randomly move transmit slots.

33. The computer program of claim 28, comprising instructions to constrain the number of transmit slots to maintain at least one of a minimum separation between transmit slots and predetermined energy levels over portions of the group of time slots.

34. A network configured to determine channel access schedules for nodes operating on the network, comprising:

a collection module to obtain traffic flow information from the nodes;

at least one processor to calculate the channel access schedules for the nodes based on the information and to configure the channel access schedules to provide no more than a predetermined level of transmit collisions between nodes;

a broadcast module to disseminate the channel access schedules to the nodes; and a synchronizer to switch the network to the channel access schedules at a given time.

35. The network of claim 34, wherein the at least one processor iteratively minimizes a multivariate function of connectivity between the nodes.

36. The network of claim 35, wherein the at least one processor applies at least one of a list of techniques for solving mathematically hard problems consisting of genetic algorithms, complete searches, heuristics and simulated annealing.

37. The network of claim 36, wherein individual nodes contain one of the at least one processors to calculate an individual channel access schedule.

* * * * *